(12) United States Patent
Lamb et al.

(10) Patent No.: US 7,617,700 B2
(45) Date of Patent: Nov. 17, 2009

(54) THERMALLY ACTUATED VALVE ASSEMBLY

(75) Inventors: Kevin W. Lamb, West Hartford, CT (US); David Piscitelli, Wallingford, CT (US); Kenneth Lionello, Waterbury, CT (US)

(73) Assignee: Rostra Precision Controls, Inc., Laurinburg, NC (US)

( * ) Notice: Subject to any disclaimer, the term of this patent is extended or adjusted under 35 U.S.C. 154(b) by 526 days.

(21) Appl. No.: 11/256,539

(22) Filed: Oct. 21, 2005

(65) Prior Publication Data

US 2007/0090200 A1  Apr. 26, 2007

(51) Int. Cl.
 *F25B 39/02* (2006.01)
 *G05D 23/12* (2006.01)
 *G05D 23/02* (2006.01)
 *G05D 23/00* (2006.01)

(52) U.S. Cl. .................. 62/504; 236/93 A; 236/99 K; 165/297

(58) Field of Classification Search .............. 62/504, 62/468; 165/296, 297, 101, 103; 137/271, 137/625.12, 625, 625.42, 625.4; 236/34.5, 236/93 A, 93 R, 99 K
See application file for complete search history.

(56) References Cited

U.S. PATENT DOCUMENTS

| 3,440,833 | A | 4/1969 | Fernandes ................ 62/196 |
| 2006/0060347 | A1* | 3/2006 | Moser et al. ............. 165/297 |
| 2006/0076129 | A1* | 4/2006 | Eliades et al. ........... 165/297 |

* cited by examiner

*Primary Examiner*—Chen-Wen Jiang
(74) *Attorney, Agent, or Firm*—Alix, Yale & Ristas, LLP

(57) ABSTRACT

An improved heat exchanger, and flow control valve assembly associated with a heat exchanger, of the type wherein the temperature responsive flow control valve is integrated with the heat exchanger the valve assembly is well suited for mounting at the discharge port of the heat exchanger, without relying on rigid interaction with the inside wall of the discharge header or the tube ends in the discharge header. In this manner, the same basic valve assembly can be utilized in a variety of heat exchanger headers, merely by adapting the connection between the end of the valve assembly closest to the discharge port, and the housing or related structure of the heat exchanger at the discharge port. To the extent a relatively standard size valve assembly is to be used with heat exchangers having discharge conduits of different cross sectional area or shape, a baffle member can be placed around the valve assembly before insertion into the header.

18 Claims, 5 Drawing Sheets

Fig. 4
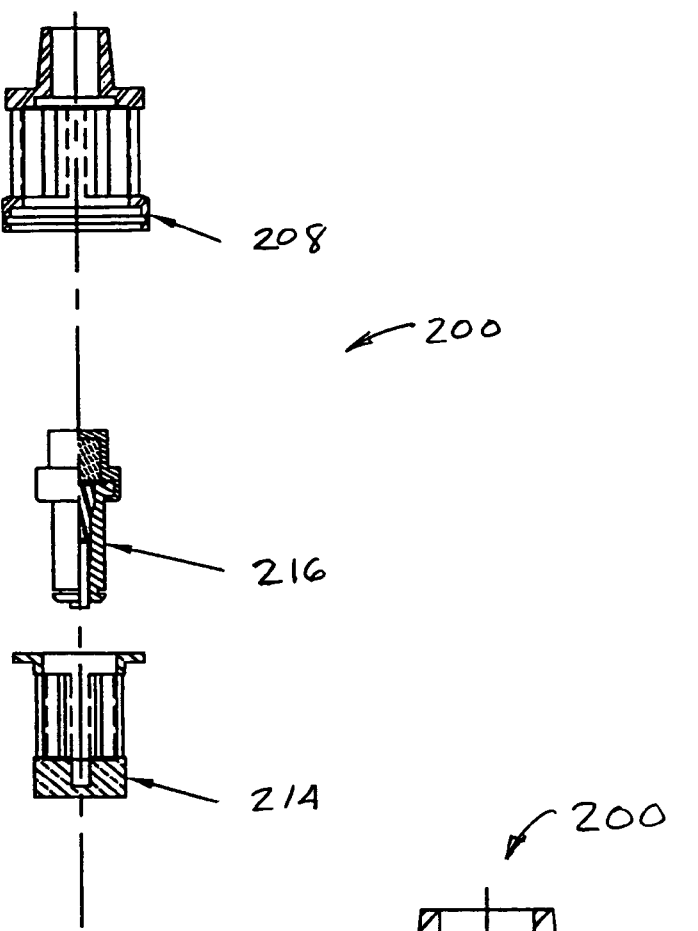
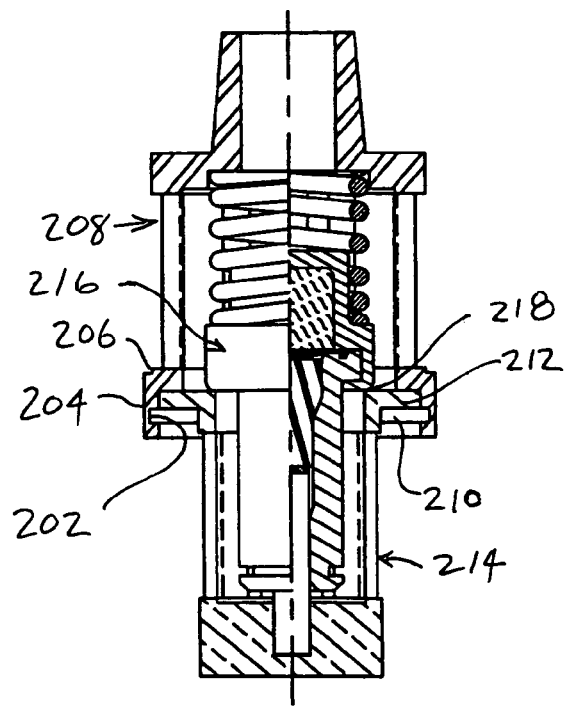
Fig. 5

THERMALLY ACTUATED VALVE ASSEMBLY

BACKGROUND OF THE INVENTION

The present invention relates to heat exchangers, especially radiators, and to flow control valves associated therewith.

Heat exchangers have been employed in a variety of sizes, shapes, and fluid handling capabilities, for many years. Many fluid handling systems and processes in which heat is generated, require that the fluid be maintained within upper and lower limits of temperature, either for efficient operation of the process, or for safety reasons.

In typical heat exchange systems of this kind, a temperature sensitive control valve is associated with the main process, which in one state bypasses the heat exchanger and in another state diverts all or some of the process fluid through the heat exchanger, before returning the flow to the process. U.S. Pat. No. 3,440,833 discloses a modified heat exchange system, in which the flow control valve is integrated with the heat exchanger itself. The valve is situated in the outlet conduit of the heat exchanger, for sensing the temperature of the out flowing fluid and, in response to that temperature, taking either one position which permits flow through some of the heat exchange elements while blocking flow through the others, or another position that permits flow through all the heat exchange elements.

SUMMARY OF THE INVENTION

It is an object of the present invention to provide an improved heat exchanger, and flow control valve assembly associated with a heat exchanger, of the type wherein the temperature responsive flow control valve is integrated with the heat exchanger.

One of the improvements that is achievable with the present invention, is that the valve assembly is well suited for mounting at the discharge port of the heat exchanger, without relying on rigid interaction with the inside wall of the discharge header or the tube ends in the discharge header. In this manner, the same basic valve assembly can be utilized in a variety of heat exchanger headers, merely by adapting the connection between the end of the valve assembly closest to the discharge port, and the housing or related structure of the heat exchanger at the discharge port. In essence, the valve assembly is cantilevered into the discharge header, from the discharge port.

This capability not only reduces the cost and complexity of supporting the valve within the discharge header but, as previously indicated, avoids the further cost of providing for the customized rigid engagement of structure in the discharge header with structure on the valve assembly.

Moreover, the valve assembly can be fabricated and assembled entirely outside the heat exchanger, secured outside the heat exchanger to an end-fitting or the like defining the discharge port, and while attached to the end-fitting, easily inserted into to the discharge header. Upon external attachment of the fitting to the header or associated heat exchanger frame, the valve assembly is fully secured in place, ready for operation.

To the extent a relatively standard size valve assembly is to be used with heat exchangers having discharge conduits of different cross sectional area or shape, a baffle member can be placed around the valve assembly before insertion into the header. A perfect seal is not required between the baffle and the heat exchanger conduit wall, inasmuch as the same type of fluid is on both sides of the baffle and the leakage flow area as compared with the total available flow, is usually insignificant.

According to a related aspect, the improvement is directed to a heat exchanger having an inlet header with associated inlet port for receiving fluid having a variable temperature and an outlet header with associated outlet port for discharging fluid at a controlled temperature. A plurality of heat exchange tubes have upstream ends fluidly connected to the inlet header and downstream ends fluidly connected to the outlet header, whereby fluid can flow from the inlet port, into the inlet header, through each tube where heat is transferred, thereby cooling the fluid, before flowing into the outlet header, and out of the outlet port. A thermally actuated valve assembly is rigidly attached to the discharge port of the outlet header and spans the downstream ends of a plurality the tubes adjacent the outlet port. The valve assembly has a valve body selectively movable between (i) one position permitting flow of fluid from some of the tubes adjacent the outlet port through the outlet header to the outlet port while blocking flow of fluid from all other tubes through the outlet header to the outlet port and (ii) another position permitting flow of fluid from all of the tubes through the outlet header to the outlet port.

The valve assembly preferably comprises an upper section having an upper, perforated sidewall spanning the downstream ends of the tubes adjacent the outlet port, a lower section having a lower, perforated sidewall spanning the downstream ends of at least one of the other tubes, an imperforate circumferential exterior wall intermediate the upper and lower sidewalls, confronting the conduit, and an internal annular shoulder defining a valve seat within the exterior wall. The thermally responsive wax actuator is situated longitudinally within the valve assembly and exposed to fluid discharged from the tubes adjacent the port into the outlet header through the perforated wall of the upper section of the valve assembly. The actuator has a housing including an annular external shoulder confronting the valve seat; whereby (i) at a first temperature of the fluid entering the header from the plurality of adjacent tubes in the header the external shoulder on the housing fluidly seals against the valve seat such that fluid from the tubes adjacent the outlet port flows through the upper section to the outlet port while flow of fluid from tubes below the valve seat is substantially blocked by the seated valve and the confrontation of said wall with the conduit and (ii) at a higher temperature the wax expands, thereby lifting the housing shoulder off the valve seat to permit fluid flow from tubes below the valve seat to the upper section of the valve assembly and through the outlet header to the outlet port.

The valve assembly may optionally include a stationary, imperforate baffle extending radially outwardly at the rigidly connected flanges and defining the radially outermost limits of the valve assembly, for closely following the internal cross section of the outlet header or conduit.

In another aspect, an embodiment is directed to a valve assembly for insertion into a conduit, comprising specially adapted upper and lower sections. The upper section includes a tubular nozzle defining a longitudinal flow axis, an upper flange formed at one end of the nozzle and extending transversely to the axis, a lower flange axially spaced from the upper flange and extending transversely to the axis, and a perforated side wall rigidly connected between the upper and lower flanges. The lower section has an upper flange located concentrically within and rigidly connected to the lower flange of the upper section, an end stop axially spaced from the upper flange of the lower section, a perforated sidewall rigidly connected between the upper and lower flanges of the lower section, and an internal annular shoulder defining a valve seat at the junction of the upper and lower sections. A thermally responsive wax actuator is situated longitudinally within the upper section of the valve assembly and has a housing including an annular external shoulder confronting the valve seat. The housing contains a thermal wax and the actuator has a piston projecting from within to a free end bearing on the end stop. The piston is axially movable in response to thermal expansion and contraction of the wax. A spring or the like in the upper section biases the housing against the valve seat. A stationary, imperforate baffle extends radially outwardly at the rigidly connected flanges and defines the radially outermost limits of the valve assembly.

The heat exchanger is herein described in a particular orientation, according to which "upper" and "lower" are used as terms of relative orientation. Another significance advantage of the present invention is that the operational effectiveness is independent of orientation of the heat exchanger. Therefore, the terms "upper" and "lower" cannot be understood as literal limitations.

BRIEF DESCRIPTION OF THE DRAWINGS

FIG. 4 is an exploded view of the main components of the valve assembly, as would be nested together by the valve assembly fabricator;

FIG. 5 is a longitudinally sectioned view of an alternative embodiment of the valve assembly, wherein the upper and lower sections are connected together by a snap ring, rather than crimping as in the embodiment of FIGS. 2 and 3.

DESCRIPTION OF THE PREFERRED EMBODIMENTS

Figure 1:
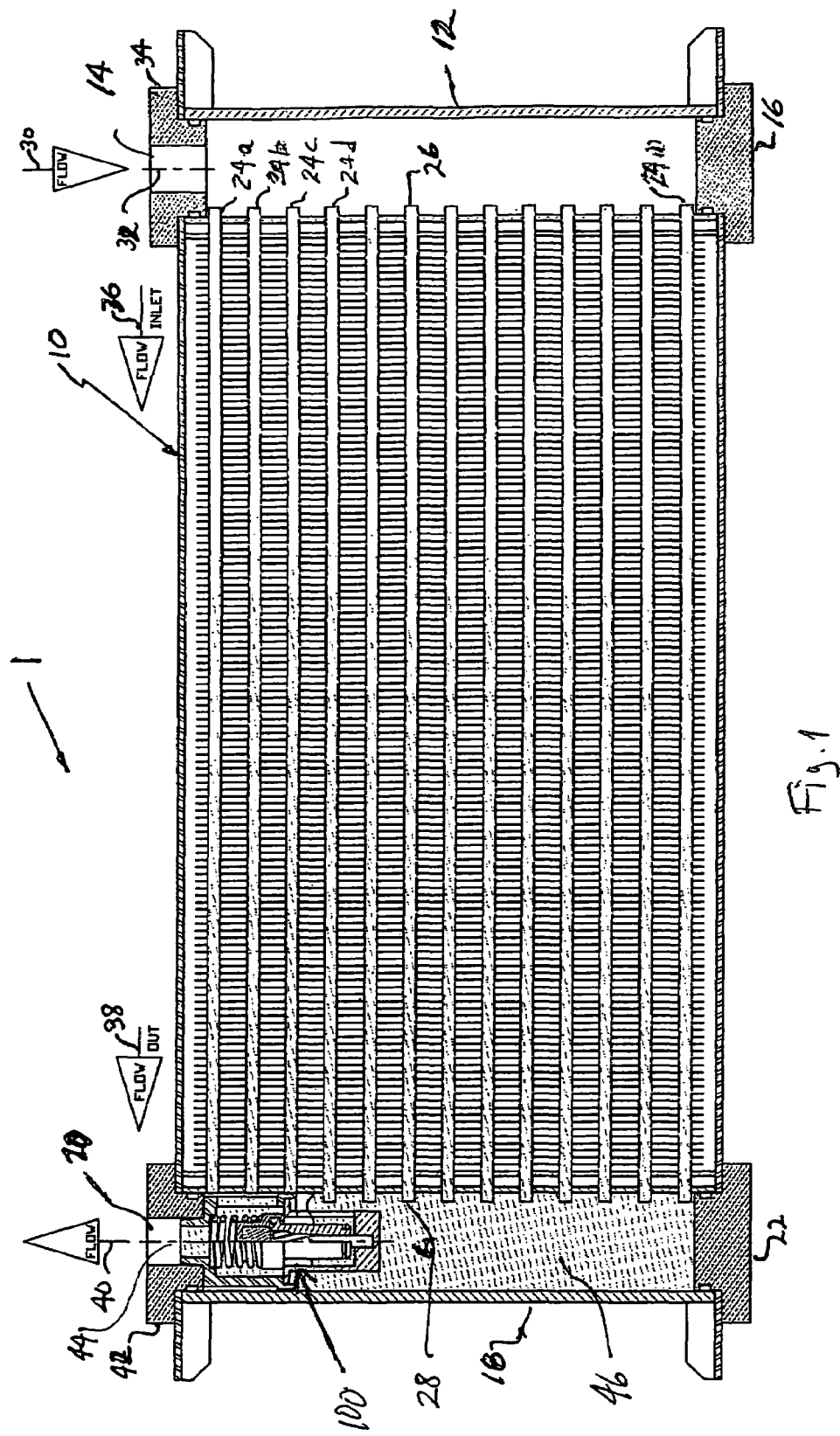
FIG. 1 is a cross sectional view of a radiator type heat exchanger with the improved thermally sensitive flow control valve, according to the preferred embodiment of the present invention.

FIG. 1 shows a heat exchanger 1 having a main frame or body 10 and an associated flow control valve 100. The frame includes an inlet header 12 having an inlet port 14 at one end and a plug 16 at the other end. Similarly, an outlet header 18 is provided on the opposite side of the body 10, with outlet port 20 and plug 22 at the other end. A multiplicity of heat exchanger tubes 24A-24M are vertically spaced apart and have interleaved fins or the like exposed to air or other heat exchange medium. Process fluid in the inlet header 12 enters each tube though the inlet ends 26 and exits each tube through the outlet ends 28 into the outlet header 18. The inlet flow 30 is shown entering the header 12 along the header longitudinal axis 32. This flow is of variable temperature according to the heat generated in the main process (not shown). The inlet fluid travels through the tubes 26, transferring heat through the fins to the heat exchange medium, before entering the outlet header 18 at a reduced temperature.

In this type of heat exchanger, all or some of the process fluid flows in direction 30 into the inlet header 12, and at least some of that fluid continuously flows in the direction 38 until it reaches the tube ends 28 whereupon it continues to flow out of the heat exchanger as indicated at 40. In this particular heat exchanger, such continuous flow in direction 38 occurs only in tubes 24A and 24B. This is a result of the valve 100 blocking flow of the fluid 46 in the outlet header 18 below the flow barrier associated with the valve, in this instance at the level of tube 24C. Under these circumstances, fluid in tubes 24C-24M, and in the inlet and outlet headers below tube 24C, remains substantially stagnant.

Only when the heat exchange capacity of tubes 24A and B is insufficient to maintain the fluid temperature below the threshold, as sensed by the thermal sensing element of the valve 100, will the valve open to provide a fluid path from the previously isolated volume 46 in the outlet header 18, through the valve and axially 44 out of the outlet port 20. In the illustrated embodiment, the outlet fitting 42 defining the outlet port 20, also secures the valve assembly 100 within the outlet header 18.

Figure 2:
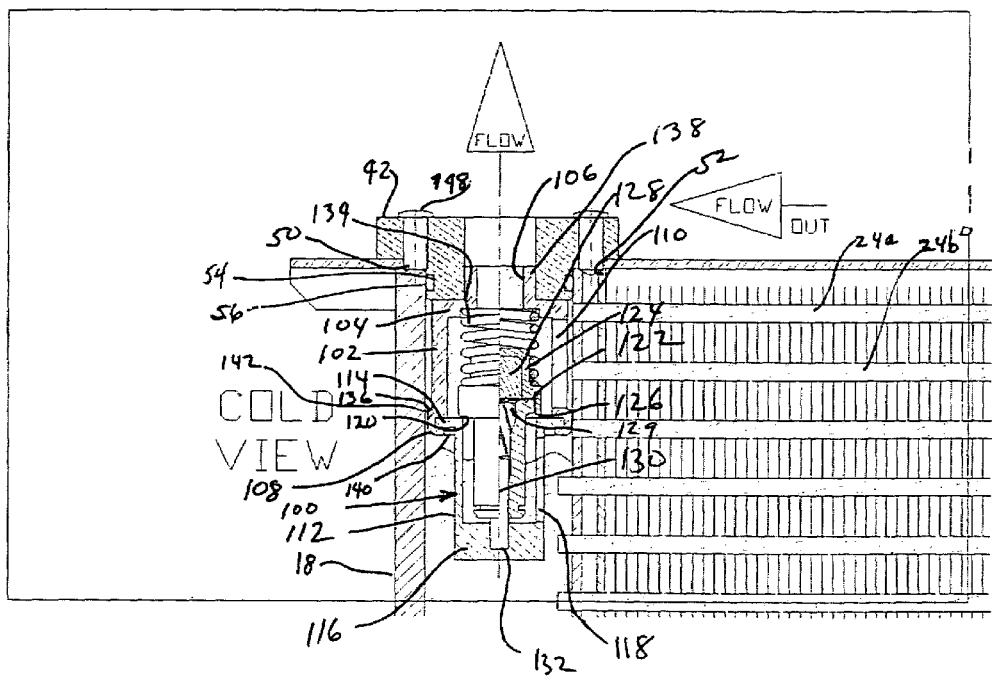
FIG. 2 is a detailed view of the portion of the heat exchanger shown in FIG. 1, with the valve positioned against the associated valve seat, permitting heat exchange flow through only some of the heat exchange tubes under cold or normal temperature conditions.

FIG. 2 shows the details of the valve assembly 100 in the outlet header 18 under cold conditions, whereby flow remains continuous through tubes 24A and 24B only. The valve assembly includes an upper section 102 spanning the downstream ends of the plurality of "continuous flow" tubes 24A, 24B adjacent the outlet port, having an upper flange 104 extending transversely to the axis and defining an internal axial flow path 106, as well as a lower flange 108 axially spaced from the upper flange and extending transversely to the axis. A perforated side wall 110 is rigidly connected between or integrally formed with the upper and lower flanges.

A lower section 112 of the valve assembly has an upper flange 114 located concentrically within and rigidly connected to the lower flange 108 of the upper section, an end stop 116 axially spaced from the upper flange of the lower section, and a perforated side wall 118 rigidly connected between or integrally formed with the upper and lower flanges 116. An internal shoulder 120 defining a valve seat is formed at the junction of the upper and lower sections 102, 112.

A thermally responsive wax actuator 122 is situated longitudinally within the upper section 102 and exposed to the fluid discharged from the tubes 24A, 24B into the outlet header and passing through the perforated wall 110 of the upper section of the valve assembly. This fluid continuously flows through opening 106 for discharge at 40. The actuator has a housing 124 including an annular external shoulder 126 confronting the valve seat 120. The housing contains a thermal wax 128 which acts directly or through a diaphragm and stem arrangement 129 or the like (in a conventional manner) on an actuating piston 130. The piston has one end within the housing and another, free end 132 projecting from the housing and bearing on the stop 116. A coil spring 134 or other resilient means known in this or related fields of technology, is provided in the upper section 102, for biasing the housing against the valve seat 120. The spring, housing, and piston are in essence aligned between the spring seat formed in the flange 140 and the piston seat formed in the end stop 116, with the spring rate sufficient to maintain the shoulder 126 of the housing, against the valve seat 120, during all variations of fluid temperature exiting the tubes 24A, 24B, up to a threshold temperature.

Figure 3:
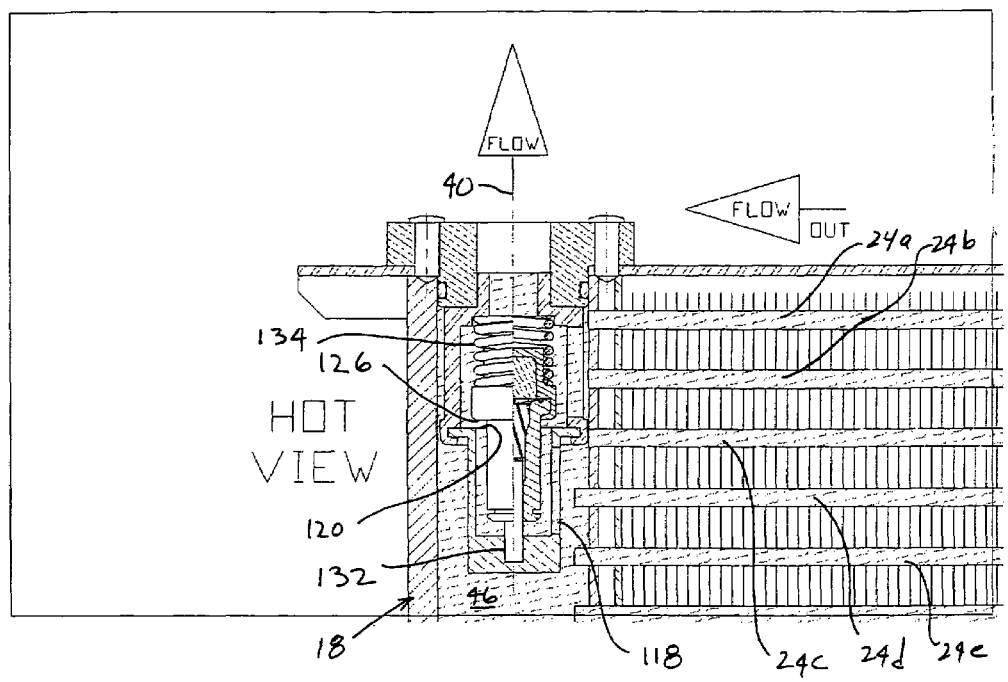
FIG. 3 is a view similar to FIG. 2, showing the position of the valve when the fluid in the outlet conduit reaches a high threshold temperature, and the valve has opened, permitting heat exchange flow through all the tubes of the heat exchanger.

At the threshold temperature, the valve opens, as shown in FIG. 3. Depending on the particular composition of the wax 128, a temperature exceeding the threshold can produce a rapid change in wax volume, or the change in volume can be proportional to the change in temperature above the threshold. In any event, upon reaching the threshold temperature, the wax expands but, due to the hard stop of the piston 132, the only available movement is against the spring 134 whereby the shoulder 126 on the housing will lift from the valve seat 120. As a result of the perforated side wall 118 of the lower section of the valve assembly, relatively cool fluid 46 in the outlet header 18 will immediately flow pass the open valve seat, mix with the excessively hot fluid exiting from tubes 24A and 24B, thereby quickly reducing the temperature of the outflow 40. Thereafter, flow resumes through all of the tubes 24A-24M and the maximum heat exchange effectiveness will be sustained until the temperature adjacent the outlet port drops to a second threshold. The decreasing fluid temperature causes the wax to contract, displacing the housing sufficiently to seal at the valve seat 120.

It should be appreciated that the operational effectiveness of the heat exchanger depends on maintaining no, or relatively low, flow between the valve assembly 100 and the inside wall of the outlet header 18. The header 18 preferably has a circular cross section, and the valve assembly 100, having a substantially cylindrical shape, would likewise have a substantially circular cross section. Under these circumstances, the leakage flowing from the lower portion 46 of the header 18 into the upper section 102 of the valve assembly 100 and mixing with the fluid from tubes 24A and 24B, would be of acceptable levels. This is preferably achieved by a short, substantially cylindrical portion of the outer side wall of the valve assembly 100 having a diameter that is approximately equal to the inner diameter of the tubular outlet conduit 18. If this side wall on the valve assembly is intermediate the perforated side wall 110 of the upper section 102 and the perforated side wall 118 of the lower section 112, a baffle is formed that blocks flow into the upper section. Only if the housing shoulder 126 is lifted off the valve seat 120, will fluid in the lower volume 46 of the header 18 pass up into the upper section of the valve assembly for discharge at 40.

This can be implemented in conjunction with facilitating fabrication of the valve assembly, by having flange 108 initially be a cylindrical extension of the upper section 102, for receiving the upper flange 114 of the lower section 112 after the actuator 122 has been seated in the upper section 102. Upon radially inward crimping, the extension forms the flange 140 whereby the upper flange 114 of the lower section is captured. Moreover, the lower flange 108 of the upper section can have a slightly larger diameter than the remainder of the upper section, forming a shoulder 136 or the like. The increased diameter of the cylindrical portion 142 of the flange thus provides the baffle 142 for restricting flow along the periphery of the valve assembly.

It should be appreciated, however, that the valve assembly 100 can readily be utilized in a heat exchanger having a outlet header 18 of a different diameter, or of a cross section that is non-circular. Under these circumstances, either an annular space, or a space of varying dimensions, would be created between a substantial circular side wall of the valve assembly and the adjacent side wall of the header 18. In essence, the header is a conduit within which the valve assembly must be coaxially mounted. A distinct baffle can then be located, for example on shoulder 136, having a shape that will substantially fully span the space between the valve assembly and the surrounding conduit wall, regardless of shape. The baffle can thus have a circular inner edge, for resting on the shoulder 136, and an outer edge of a shape that will conform with the cross sectional shape of the conduit inner wall. One such distinct, stationary, imperforate baffle extending radially outwardly at the rigidly connected flanges and defining the radially outermost limits of the valve assembly, will be described with respect to FIGS. 6.

The valve assembly 100 is preferably anchored in the vicinity of the outlet port 20, to project longitudinally into the outlet header 18. This can be accomplished by securing the valve assembly to a fitting 42, and securing the fitting 42 via bolts or the like 48, to threaded bores 50 or the like in the conduit 18 and/or the frame 10, 52. Preferably, the upper section 102 of the valve assembly includes a nozzle or the like 138 that is externally threaded for engagement with internal threads in the bore of fitting 42. The portion of the fitting 42 that enters the header conduit for engagement with the nozzle 138, has an external groove 54 for receiving an O-ring or the like 56 to prevent leakage flow out of the heat exchanger, instead of through the outlet port 106.

The embodiment of the valve assembly 200 show in FIGS. 4 and 5 is very similar to that shown in FIG. 3, except that a groove 202 is formed on the interior of the rim portion 204 of the lower flange 206 in the upper section 208, for receiving a snap ring 210 to secure the flange 212 of the lower section 214 of the valve assembly, thereby encapsulating the actuator 216 in relation to the valve seat 218.

Figure 6B:
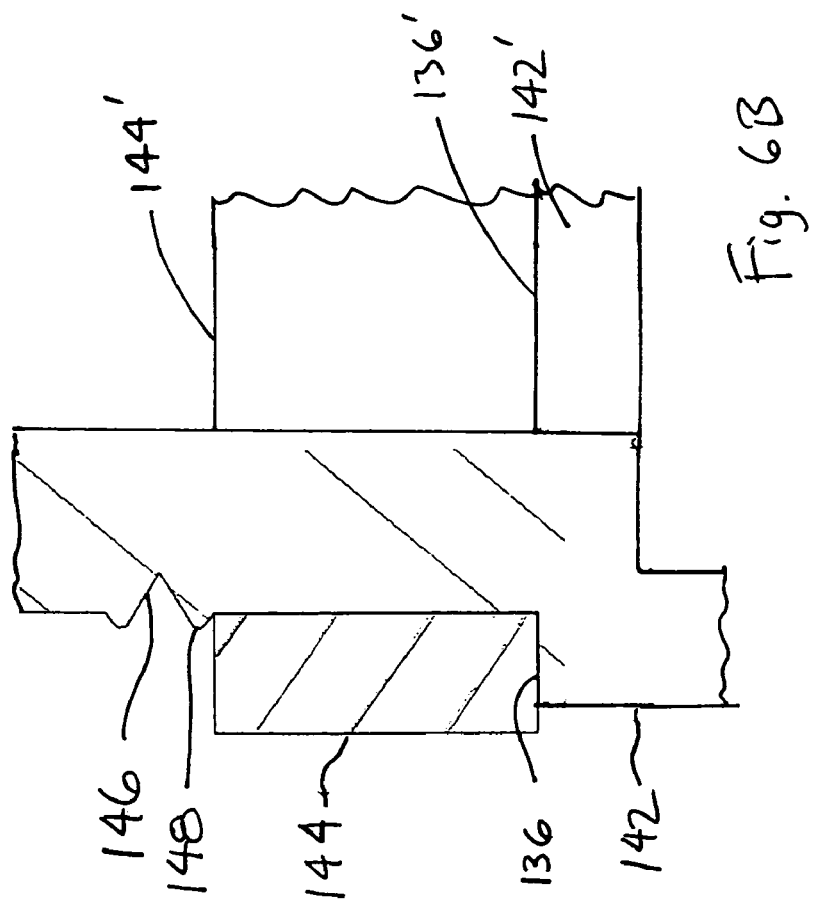
FIGS. 6A and B are detailed views of the location of a baffle, and one technique for staking the baffle, respectively, for the embodiment of FIG. 1.
Figure 6A:
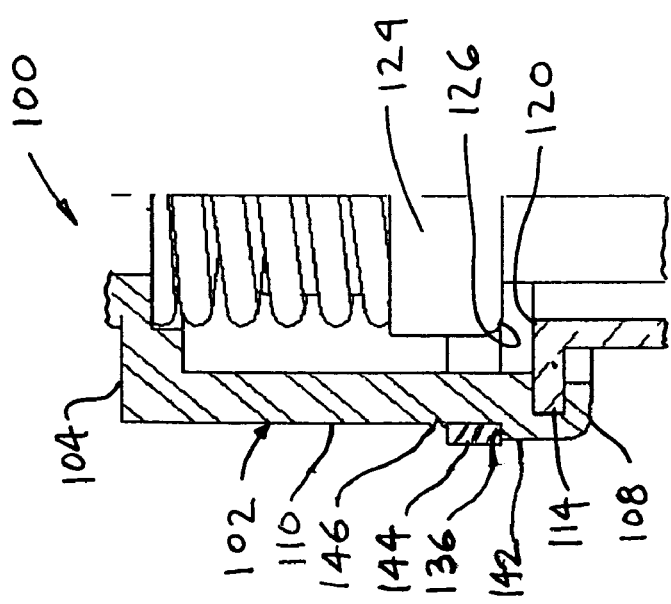

FIG. 6A is a detailed view of the valve 100 of FIG. 1, shown in the hot flow condition of FIG. 3, but with a distinct baffle member 144 carried on shoulder 136 of the upper section 102 of the valve. FIG. 6B is a further detailed view of the how the baffle 144 is staked in position on the valve, to resist the upward hydraulic pressure in the cold condition associated with FIG. 2. As described above, the radially outer surface of the baffle 144 need not be circular, but could be oval or polygonal, to closely match the interior wall of the conduit.

In the illustrated embodiment, before installation the baffle is slipped over the sidewalls 110 of the upper section of the valve, to the annular ledge or shoulder 136 formed by the annular solid material defining the external cylindrical wall 142. The valve may have a plurality of spaced apart sidewalls 110, and preferably three equilaterally spaced sidewalls will be pinched with a tool in a known manner to deform the material as shown at 146, including the formation of a ridge or the like 148 immediately above, and preferably bearing on the upper surface of the baffle 144. The lower shoulder 136 prevents downward movement of the baffle, and the ridge 148 prevents upward movement of the baffle, when subjected to fluid pressure within the heat exchanger.

FIG. 6B shows that the portion of the upper section of the valve forming the wall 142 is, in essence, a ring 142' that circumscribes the axis of the valve. Similarly, the baffle 144 is in essence a ring 144' that circumscribes the axis of the valve, while resting on the shoulder 136, which also circumscribes the valve axis as indicated at 136'. Preferably, the baffle 144 is situated laterally of the housing 124 of the thermal actuator, with the support shoulder 136 and associated cylindrical wall 142 being situated laterally of the seating surface 120 and the sealing surface 126, which ultimately control whether the valve is open or closed.

It should be appreciated that other techniques for retaining the baffle 144 in place may also be used, such as by pinning above the baffle, in the vicinity of ridge 148, or through the baffle.

The invention claimed is:

1. A heat exchanger comprising:
   an inlet header with associated inlet port for receiving fluid having a variable temperature;

an outlet header having an internal wall and an outlet port for discharging fluid at a controlled temperature;

a plurality of heat exchange tubes having upstream ends fluidly connected to the inlet header and downstream ends fluidly connected to the outlet header, whereby fluid can flow from the inlet port, into the inlet header, through each tube where heat is transferred, thereby cooling the fluid, before flowing into the outlet header, and out of the outlet port;

a thermally actuated valve assembly in the outlet header, spanning the downstream ends of a plurality the tubes adjacent the outlet port, and having a valve body selectively movable between (i) one position permitting flow of fluid from some of the tubes adjacent the outlet port through the outlet header to the outlet port while blocking flow of fluid from all other tubes through the outlet header to the outlet port and (ii) another position permitting flow of fluid from all of the tubes through the outlet header to the outlet port, wherein the valve assembly is rigidly attached to the discharge port and extends into without attachment to the internal wall of the outlet header wherein the valve assembly further comprises an upper section having an upper, perforated sidewall spanning the downstream ends of said plurality of tubes adjacent the outlet port, a lower section having a lower, perforated sidewall spanning the downstream ends of at least one of said other tubes, an imperforate circumferential exterior wall intermediate the upper and lower sidewalls, confronting the interior wall of the outlet header, an internal annular shoulder defining a valve seat within the exterior wall, a thermally responsive wax actuator situated longitudinally within the valve assembly and exposed to fluid discharged from said adjacent tubes into the outlet header through the perforated wall of the upper section of the valve assembly, said actuator having a housing including an annular external shoulder confronting the valve seat, whereby (i) at a first temperature of the fluid entering the header from said plurality of adjacent tubes in the header the external shoulder on the housing fluidly seals against the valve seat such that fluid from the tubes adjacent the outlet port flows through the upper section to the outlet port while flow of fluid from tubes below the valve seat is substantially blocked by the seated valve and the confrontation of said wall with the conduit and (ii) at a higher temperature the wax expands, thereby lifting the housing shoulder off the valve seat to permit fluid flow from tubes below the valve seat to the upper section of the valve assembly and through the outlet header to the outlet port.

2. The heat exchanger of claim 1, wherein a baffle is located axially adjacent the imperforate exterior wall, and extends radially outwardly to closely conform to the interior wall of the outlet header.

3. The heat exchanger of claim 2, wherein the imperforate exterior wall is bounded by a circumferential shoulder and said baffle has an inner circular rim that rests on said shoulder.

4. The heat exchanger of claim 3, wherein means are operatively associated between the baffle and the perforated sidewall of the upper section, for preventing axial movement of the baffle away from said shoulder.

5. A heat exchanger comprising:

an elongated inlet header with associated inlet port for receiving fluid having a variable temperature;

an elongated outlet header having a longitudinal axis and associated outlet port for axially discharging fluid at a controlled temperature;

a plurality of heat exchange tubes having upstream ends fluidly connected to the inlet header and downstream ends fluidly connected to the outlet header, whereby fluid can flow from the inlet port, into the inlet header, through each tube where heat is transferred, thereby cooling the fluid, before flowing into the outlet header, and out of the outlet port;

a thermally actuated valve assembly secured to the outlet port and coaxially projecting into the outlet header such that the outlet header forms a conduit having a longitudinal axis and a first cross sectional shape around the valve assembly, said valve assembly spanning the downstream ends of a plurality of the tubes adjacent the outlet port, and having a valve body selectively movable between (i) one position permitting flow of fluid from some of the tubes adjacent the outlet port through the outlet header to the outlet port while blocking flow of fluid from all other tubes through the outlet header to the outlet port and (ii) another position permitting flow of fluid from all of the tubes through the outlet header to the outlet port;

wherein the valve assembly further includes an upper section spanning the downstream ends of said plurality the tubes adjacent the outlet port, having an upper flange extending transversely to the axis and defining an internal axial flow path, a lower flange axially spaced from the upper flange and extending transversely to the axis, and a perforated side wall rigidly connected between the upper and lower flanges;

a lower section having an upper flange located concentrically within and rigidly connected to the lower flange of the upper section, an end stop axially spaced from the upper flange of the lower section, a perforated sidewall rigidly connected between the upper and lower flanges of the lower section, and an internal annular shoulder defining a valve seat at the junction of the upper and lower sections;

a thermally responsive wax actuator situated longitudinally within the upper section of the valve assembly and exposed to fluid discharged from said adjacent tubes into the outlet header through the perforated wall of the upper section of the valve assembly, said actuator having a housing including an annular external shoulder confronting the valve seat, said housing further containing a thermal wax and said actuator having a piston with one end within the housing and projecting from the housing and a free end bearing on said end stop, said piston being axially movable in response to thermal expansion and contraction of the wax;

means in the upper section for biasing the housing against the valve seat; and a baffle surrounding the rigidly connected flanges and substantially conforming to the conduit cross section of the header;

whereby (i) at a first temperature of the fluid entering the header from said plurality of adjacent tubes in the header the external shoulder on the housing fluidly seals against the valve seat such that fluid from the tubes adjacent the outlet port above the baffle flows through the upper section to the outlet port while flow of fluid from tubes below the baffle in the outlet header to the outlet port is blocked and (ii) at a higher temperature the wax expands, pushing the piston longitudinally and thereby lifting the housing shoulder off the valve seat to permit fluid flow from tubes below the baffle past the valve seat to the upper section of the valve assembly and through the outlet header to the outlet port.

6. The heat exchanger of claim 5, wherein
the internal flow path defined at the upper flange of the upper section is formed by a tubular nozzle projecting toward the outlet port; and
an outlet fitting is secured to the upper flange and to the conduit or frame.

7. The heat exchanger of claim 6, wherein
the nozzle is externally threaded; and
the outlet fining has an internally threaded bore that is coaxially mated with the nozzle, and an outer flange that is attached to the conduit.

8. The heat exchanger of claim 5, wherein the lower flange of the upper section includes a portion that rigidly captures the upper flange of the lower section.

9. The heat exchanger of claim 5, wherein the lower flange of the upper section includes an external shoulder that carries said baffle.

10. The heat exchanger of claim 9, wherein
the conduit cross section is non-circular;
the junction of the flanges of the upper and lower sections forms an exterior wall that is substantially cylindrical, thereby producing a non-circular clearance between the exterior wall and the conduit; and
the baffle has a noncircular shape that spans substantially all said clearance.

11. The heat exchange of claim 5 wherein the lower flange of the upper section surrounds the upper flange of the lower section and a snap ring secures said flanges together.

12. A valve assembly for insertion into a conduit, comprising:
an upper section including a tubular nozzle defining a longitudinal flow axis, an upper flange formed at one end of the nozzle and extending transversely to the axis, a lower flange axially spaced from the upper flange and extending transversely to the axis, and a perforated side wall rigidly connected between the upper and lower flanges;
a lower section having an upper flange located concentrically within and rigidly connected to the lower flange of the upper section, an end stop axially spaced from the upper flange of the lower section, a perforated sidewall rigidly connected between the upper and lower flanges of the lower section, and an internal annular shoulder defining a valve seat at the junction of the upper and lower sections;
a thermally responsive wax actuator situated longitudinally within the upper section of the valve assembly, said actuator having a housing including an annular external shoulder confronting the valve seat, said housing further containing a thermal wax and said actuator having a piston with one end within the housing and projecting from the housing and a free end bearing on said end stop, said piston being axially movable in response to thermal expansion and contraction of the wax;
means in the upper section for biasing the housing against the valve seat; and
a stationary, imperforate baffle extending radially outwardly at the rigidly connected flanges and defining the radially outermost limits of the valve assembly.

13. The valve assembly of claim 12, wherein the baffle is a circular ring.

14. The valve assembly of claim 12, wherein the baffle is an oblong ring having a circular central opening surrounding the upper section at said connected flanges and a non-circular periphery adapted to closely follow the cross section of a non-circular conduit.

15. The valve assembly of claim 12, wherein the lower flange of the upper section includes a portion that rigidly captures the upper flange of the lower section.

16. The heat exchanger of claim 12, wherein the lower flange of the upper section includes an external shoulder that carries said baffle.

17. A heat exchanger comprising:
an inlet header with associated inlet port for receiving fluid having a variable temperature;
an outlet header having an internal wall and an outlet port for discharging fluid at a controlled temperature;
a plurality of heat exchange tubes having upstream ends fluidly connected to the inlet header and downstream ends fluidly connected to the outlet header, whereby fluid can flow from the inlet port, into the inlet header, through each tube where heat is transferred, thereby cooling the fluid, before flowing into the outlet header, and out of the outlet port;
a thermally actuated valve assembly in the outlet header, spanning the downstream ends of a plurality the tubes adjacent the outlet port, and having a valve body selectively movable between (i) one position permitting flow of fluid from some of the tubes adjacent the outlet port through the outlet header to the outlet port while blocking flow of fluid from all other tubes through the outlet header to the outlet port and (ii) another position permitting flow of fluid from all of the tubes through the outlet header to the outlet port, wherein the valve assembly is rigidly attached to the discharge port and extends into without attachment to the internal wall of the outlet header;
wherein a fitting is attached externally to the outlet header at the outlet port and said valve assembly is attached to the fitting and cantilevered from the fitting into the outlet header; and
the valve assembly further comprises
an upper section having an upper, perforated sidewall spanning the downstream ends of said plurality of tubes adjacent the outlet port,
a lower section having a lower, perforated sidewall spanning the downstream ends of at least one of said other tubes,
an annular shoulder defining a valve seat situated between the upper and lower sections;
a thermally responsive wax actuator situated longitudinally within the valve assembly and exposed to fluid discharged from said adjacent tubes into the outlet header through the perforated wall of the upper section of the valve assembly, said actuator having a housing including an annular shoulder confronting the valve seat;
whereby (i) at a first temperature of the fluid entering the header from said plurality of adjacent tubes in the header the external shoulder on the housing fluidly seals against the valve seat such that fluid from the tubes adjacent the outlet port flows through the upper section to the outlet port while flow of fluid from tubes below the valve seat is substantially blocked by the seated valve and the confrontation of said wall with the conduit and (ii) at a higher temperature the wax expands, thereby lifting the housing shoulder off the valve seat to permit fluid flow from tubes below the valve seat to the upper section of the valve assembly and through the outlet header to the outlet port.

18. A heat exchanger comprising:

an inlet header with associated inlet port for receiving fluid having a variable temperature;

an outlet header having an internal wall and an outlet port for discharging fluid at a controlled temperature;

a plurality of heat exchange tubes having upstream ends fluidly connected to the inlet header and downstream ends fluidly connected to the outlet header, whereby fluid can flow from the inlet port, into the inlet header, through each tube where heat is transferred, thereby cooling the fluid, before flowing into the outlet header, and out of the outlet port;

a thermally actuated valve assembly in the outlet header, spanning the downstream ends of a plurality the tubes adjacent the outlet port, and having a valve body selectively movable between (i) one position permitting flow of fluid from some of the tubes adjacent the outlet port through the outlet header to the outlet port while blocking flow of fluid from all other tubes through the outlet header to the outlet port and (ii) another position permitting flow of fluid from all of the tubes through the outlet header to the outlet port, wherein the valve assembly is rigidly attached to the discharge port and extends into without attachment to the internal wall of the outlet header; wherein the valve assembly further comprises an upper section having an upper, perforated sidewall spanning the downstream ends of said plurality of tubes adjacent the outlet port, a lower section having a lower, perforated sidewall spanning the downstream ends of at least one of said other tubes, an annular shoulder defining a valve seat situated between the upper and lower sections;

a thermally responsive wax actuator situated longitudinally within the valve assembly and exposed to fluid discharged from said adjacent tubes into the outlet header through the perforated wall of the upper section of the valve assembly, said actuator having a housing including an annular shoulder confronting the valve seat;

whereby (i) at a first temperature of the fluid entering the header from said plurality of adjacent tubes in the header the external shoulder on the housing fluidly seals against the valve seat such that fluid from the tubes adjacent the outlet port flows through the upper section to the outlet port while flow of fluid from tubes below the valve seat is substantially blocked by the seated valve and the confrontation of said wall with the conduit and (ii) at a higher temperature the wax expands, thereby lifting the housing shoulder off the valve seat to permit fluid flow from tubes below the valve seat to the upper section of the valve assembly and through the outlet header to the outlet port.

* * * * *

UNITED STATES PATENT AND TRADEMARK OFFICE
CERTIFICATE OF CORRECTION

PATENT NO. : 7,617,700 B2 Page 1 of 1
APPLICATION NO. : 11/256539
DATED : November 17, 2009
INVENTOR(S) : Lamb et al.

It is certified that error appears in the above-identified patent and that said Letters Patent is hereby corrected as shown below:

Column 9:
Line 12, delete "fining" and substitute --fitting--.

Signed and Sealed this

Ninth Day of March, 2010

David J. Kappos
*Director of the United States Patent and Trademark Office*